(12) United States Patent
Harper et al.

(10) Patent No.: US 9,151,304 B2
(45) Date of Patent: Oct. 6, 2015

(54) MULTI-STAGE HYDRAULIC CYLINDER ASSEMBLY

(75) Inventors: Bryan Michael Harper, Yorktown, VA (US); James Arthur Whitfield, Jr., Chesapeake, VA (US)

(73) Assignee: Liebherr-Mining Equipment Company, Newport News, VA (US)

( * ) Notice: Subject to any disclaimer, the term of this patent is extended or adjusted under 35 U.S.C. 154(b) by 851 days.

(21) Appl. No.: 13/420,130

(22) Filed: Mar. 14, 2012

(65) Prior Publication Data

US 2012/0255432 A1    Oct. 11, 2012

(30) Foreign Application Priority Data

Mar. 15, 2011    (DE) .......................... 10 2011 013 987

(51) Int. Cl.
*F01B 7/20*    (2006.01)
*F15B 15/22*    (2006.01)
*F15B 15/16*    (2006.01)
*F16F 9/06*    (2006.01)

(52) U.S. Cl.
CPC .............. *F15B 15/16* (2013.01); *F15B 15/227* (2013.01); *F16F 9/062* (2013.01); *F16F 9/067* (2013.01)

(58) Field of Classification Search
CPC ........ F15B 15/16; F15B 15/227; F16F 9/062; F16F 9/067
USPC .......................... 92/52, 53, 85 R; 91/169, 519
See application file for complete search history.

(56) References Cited

U.S. PATENT DOCUMENTS

| | | | | |
|---|---|---|---|---|
| 4,041,839 A | * | 8/1977 | Olson | 91/422 |
| 4,516,468 A | * | 5/1985 | Sheriff | 92/52 |
| 5,099,748 A | * | 3/1992 | Neubauer | 92/52 |
| 5,613,418 A | * | 3/1997 | Guido | 92/52 |
| 6,152,015 A | * | 11/2000 | Migliori | 92/52 |

FOREIGN PATENT DOCUMENTS

| | | |
|---|---|---|
| JP | 50-96780 | 8/1975 |
| JP | 58-45405 | 3/1983 |
| JP | 58-50303 | 3/1983 |

* cited by examiner

*Primary Examiner* — Michael Leslie
(74) *Attorney, Agent, or Firm* — Dilworth & Barrese LLP

(57) ABSTRACT

A cushion arrangement for smoothing stage changes in an hydraulic cylinder and including at least one compression chamber of variable volume with a movable and/or deformable chamber wall element displaceable by at least one of the pistons when approaching the transition zone between first and second stages of displacement. The compression chamber is operatively connected to a gas volume to be compressed upon displacement of the chamber wall element.

19 Claims, 3 Drawing Sheets

MULTI-STAGE HYDRAULIC CYLINDER ASSEMBLY

BACKGROUND OF THE INVENTION

The present invention relates to a multi-stage hydraulic cylinder for providing multiple stages of displacement with different cylinder forces, comprising a cylinder housing, a first stage piston slidably received in said cylinder housing to be displaced over a first stage of displacement, a second stage piston coupled to said first stage piston to be displaced, together with said first stage piston, over said first stage of displacement and to be displaced relative to said first stage piston over a second stage of displacement, said first stage piston and said second stage piston having pressure surface areas different from each other to provide for said different cylinder forces, and further comprising a cushion arrangement for smoothening stage changes.

Certain applications of hydraulic cylinders require different displacement forces at different stages of displacement. For example, in large mining trucks, the dumping body for collecting and transporting the mining material is tilted about a horizontal axis to dump the material, said tilting movement requiring a large driving force at the initial stage of tilting, whereas the required driving force is considerably decreased when the dumping body reaches a more upright position with the center of gravity being closer to the tilting axis and a part of the material already having been dumped.

In such hydraulic systems where one or more fixed or variable displacement pumps may be used for operating one or more multi-stage hydraulic cylinders, there exists mechanical contact at the time of stage change. In applications where the force required from the cylinder decreases dramatically as extended length increases, it is desirable to have considerably smaller second stage than first stage, resulting in a large area ratio. However, such large area ratio causes a shock when the first stage piston reaches its mechanical stop. In certain applications of such multi-stage hydraulic cylinders, basically the same pressure is supplied to both the first stage piston and the second stage piston so due to the large area ratio of such pistons a rather hard shock is caused when the first stage piston reaches the end of its displacement path and hits against the mechanical stop.

In order to reduce such shocks, a cushioning arrangement may be used to decelerate the piston at the end of its displacement path before the piston hits said mechanical stop, thereby reducing the velocity of the piston when hitting against the mechanical stop. Various solutions for such cushioning arrangements have been proposed. For example, document U.S. Pat. No. 4,397,218 discloses a cushioning device for decelerating and stopping the piston in a hydraulic cylinder by restricting and throttling the fluid flow from the cylinder. More particularly, the flow of fluid is reduced as the end of stroke in the cylinder is reached. A plunger is slidably received in a flow path, said plunger being pushed deeper into said flow path by the piston approaching its end position, wherein the flow path gets further restricted as the plunger is inserted deeper. However, the downside to this, especially in a fixed displacement system, is any fluid that does not do work on the cylinder is required to flow over a relief valve creating unnecessary heat.

Furthermore, document U.S. Pat. No. 7,104,054 discloses a way to electronically control the speed as a piston reaches the end of its stroke. The hydraulic cylinder system includes a sensor configured to generate a signal indicative of hydraulic cylinder position and a valve coupled to the cylinder to control flow rate of hydraulic fluid to and from the cylinder so that an electronic controller that is coupled to the sensor may command valve opening and closing in response to the hydraulic cylinder position. Such electronic sensing and commanding system is quite expensive, increases complexity and is prone to damages and functional errors under rough environmental conditions.

Furthermore, document US 2006/0151269 discloses a cushioning device that completely prevents the piston from colliding with the end boss. At the end of the piston stroke, a portion of the hydraulic oil to be discharged from the pressure chamber is trapped and may be discharged via a throttle clearance only. In addition, an elastic cushion element made of rubber is positioned between the end boss and the piston to prevent the piston from directly hitting onto the end boss. Such elastic cushion, however, is not advantageous in certain applications due to multiple reasons. In particular, the space required to have an elastic cushion element is not available in certain cylinders such as multi-stage cylinders where a plurality of pistons are to be received within the cylinder housing. Also the forces present in cylinders for large applications such as mining trucks or other large construction equipment prohibit effective use of an elastic cushion element made of rubber. Furthermore, the durability of an elastic cushion element is rather limited in applications where the cylinder is operated at high frequencies and high loads.

SUMMARY OF THE INVENTION

It is therefore an objective of the present invention to provide for an improved multistage hydraulic cylinder that avoids disadvantages of the prior art and provides for improvement of the known solutions. In particular, the invention aims at a small size, compact cushioning arrangement that shows resistance against high loads and has an increased lifetime without sacrificing reliable and precise dampening and reducing the shocks at stage changes of multiple-stage cylinders.

According to the present invention, this objective is achieved by a multiple-stage hydraulic cylinder as described herein. Preferred embodiments of the present invention are laid down herein.

It is suggested to incorporate a gas cushion between the stages of the hydraulic cylinder to reduce the mechanical shock when changing stages. The gas volume is arranged to become compressed when the respective piston reaches the end of its displacement path. In accordance with the present invention, the cushion arrangement includes at least one compression chamber of variable volume with a movable and/or deformable chamber wall element to be displaced by at least one of the pistons when approaching the transition zone between said first and second stages of displacement, said compression chamber being operatively connected to a gas volume to be compressed upon displacement of said chamber wall element and compression of said compression chamber. Upon contact with the movable and/or deformable chamber wall element, the hydraulic fluid driving the piston continues to cause the respective stage of the cylinder to extend or retract, thus causing the cushioning chamber to compress. As the cushioning device compresses, so does the gas which it is charged by. As the gas is compressed, the cushioning device reacts with the piston reaching its end position by exerting force back against the piston. This force occurs until the pressure against the piston becomes greater than the pressure required to move the other stage piston. At that time, the other stage will begin to move. This happens before mechanical contact between the piston reaching the end of its displacement path and the respective end boss occurs, thus preventing mechanical shock. Such gas cushion can be designed very compact and gives large freedom in designing and positioning.

According to a preferred embodiment of the invention, at least a part of said compression chamber is integrated into the cylinder housing wherein the movable and/or deformable chamber wall element is preferably slidably received within the cylinder housing to effect compression of the compression chamber upon contact or actuation by the piston to be decelerated. Such incorporation of the compression chamber into the cylinder's main body provides for a very compact design and reduces the elements necessary to actuate the cushioning device.

The said compressible gas volume may be received within the aforementioned compression chamber which, in this embodiment, is the gas chamber for compressing the gas volume. Consequently, the gas volume, at least in part, may be incorporated into the interior of the cylinder housing.

Alternatively, instead of incorporating the gas cushion internal to the cylinder, it could be located externally and connected to the hydraulic lines of the cylinder via adequately sized porting. More particularly, the aforementioned compression chamber may be filled with a substantially incompressible fluid such as oil, wherein the compressible gas volume is received within a compressible gas chamber of an external gas spring or gas cushioning device which is operatively connected to the compression chamber via a conduit through which incompressible fluid discharged from the compression chamber upon compression thereof may be applied to said external gas spring to compress the gas volume received therein. Such external positioning of the compressible gas cushion prevents the cylinder from being subject to heat resulting from compressing the gas volume. In addition, the size of the gas cushion can be chosen appropriately without affecting size of the cylinder or reducing longitudinal displacement of the cylinder.

The said movable and/or deformable chamber wall element may be configured in different ways, wherein it is preferably shaped such to create a pocket with the stationary body of the cylinder. This pocket forms at least a part of the compression chamber and can be precharged with a compressed gas such as nitrogen, through a port extending to the outside of the stationary cylinder body, or with incompressible fluid such as oil when providing the gas cushion externally.

Advantageously, the gas chamber is precharged with compressed gas at a sufficient pressure which may vary with the size of the gas chamber. Because the cushioning device is precharged with compressed gas, the cushioning device itself is normally in the fully extended position.

In accordance with a preferred embodiment of the invention, the said chamber wall element is positioned at the displacement path of the first stage piston and includes a contact portion to be contacted by the first stage piston, wherein the said piston may directly contact said movable wall element of the gas chamber with a shoulder or a face portion of the piston. Alternatively, the said piston may get into indirect contact to the said wall element, e.g. via an intermediate actuation member provided between the piston and the movable wall element. As the cylinder is displaced, the distance between the first stage piston and the cushioning device decreases until contact of the piston to the said movable wall element occurs. Upon contact with the cushioning device, the piston continues to be displaced thus causing the cushioning device to compress.

According to a preferred embodiment, the said movable and/or deformable chamber wall element may include a displaceable ring slidably received between an inner circumferential surface of the stationary cylinder body and an outer circumferential surface of a piston rod or sleeve section connected to the first stage piston. When providing such displaceable ring, the compression chamber, particularly when filled with gas, may include a ring-shaped compression section between the cylinder gland and said movable ring, wherein preferably the said compression chamber is formed by a pocket defined between said movable ring, the outer circumferential surface of the cylinder housing, the cylinder gland and the piston rod of the first stage piston.

In accordance with another preferred embodiment of the invention, the said movable and/or deformable wall element of the compression chamber of the cushioning device may form at least a part of the end stopper or end boss for limiting the first stage displacement of the first stage piston. Thus, the said movable wall element may fulfil a double function. On the one hand, it serves to compress the cushioning gas to provide for shock reduction. On the other hand, it defines the stop for the first stage displacement.

Preferably, the said gas chamber is prevented from being compressed too much so that the pressure in the gas chamber is limited. In other words, the gas chamber may not be compressed to a volume below a minimum volume. To prevent the gas chamber pression from exceeding a maximum admissible value, the displacement range of the movable and/or deformable wall element is limited. Preferably, there is an expansion limiter limiting displacement of the chamber wall element in an expansion direction and a compression limiter for limiting displacement of the chamber wall element in a compression direction, thereby allowing only limited displacement of the chamber wall element between a more compressed position and a more expanded position.

In case the movable wall element forms the mechanical stop for the first stage piston, the movable wall element is preferably provided with a mechanical stopper section that stops displacement of the chamber wall element when said gas chamber has reached its predetermined minimum volume. The said stopper section of the wall element engages with a suitable support section at the stationary cylinder body, e.g. it may engage the cylinder gland, when the movable wall element has reached its position of maximum compression. Upon contact of the stopper section with the support section of the stationary body, any further pressure from the piston is not transformed into additional gas pressure, but is transmitted via said stopper section to the stationary body of the cylinder.

In order to combine a compact design with direct backup of the forces applied to the movable wall element, the said movable wall element may be displaceably received and trapped within a recess or a stepped portion of the inner circumferential wall of the cylinder housing and the cylinder gland thereof so the said chamber wall element which is preferably ring-shaped, may be displaced between a shoulder of the inner wall of the cylinder housing and the cylinder gland.

The gas cushion for reducing the mechanical shock when changing cylinder stages may be used in different cylinder types, wherein it is in particular advantageous in multiple-stage hydraulic cylinders having a large area ratio of the effective pressure surface areas of the multiple-stage pistons. Such piston surface area ratio may vary and is typically larger than 120%. Preferably, the ratio of the effective pressure surface area of the first stage piston to the effective pressure surface area of the second stage piston is within a range from 120% to 300%, preferably 120% to 200%.

To achieve a compact, slim cylinder design with small diameters that nevertheless provide for large axial displacement, the multiple-stage pistons may be incorporated into each other. More particularly, the first stage piston and/or the preferably hollow, sleeve-like piston rod connected to said first stage piston may be provided with a cylindrical bore and/or may form a cylinder recess in which the second stage piston is slidably received.

BRIEF DESCRIPTION OF THE DRAWINGS

In the following, a preferred embodiment of the present invention is described in greater detail on the basis of the example illustrated in the drawings. In the said drawings shows.

DESCRIPTION OF THE PREFERRED EMBODIMENTS

Figure 1:
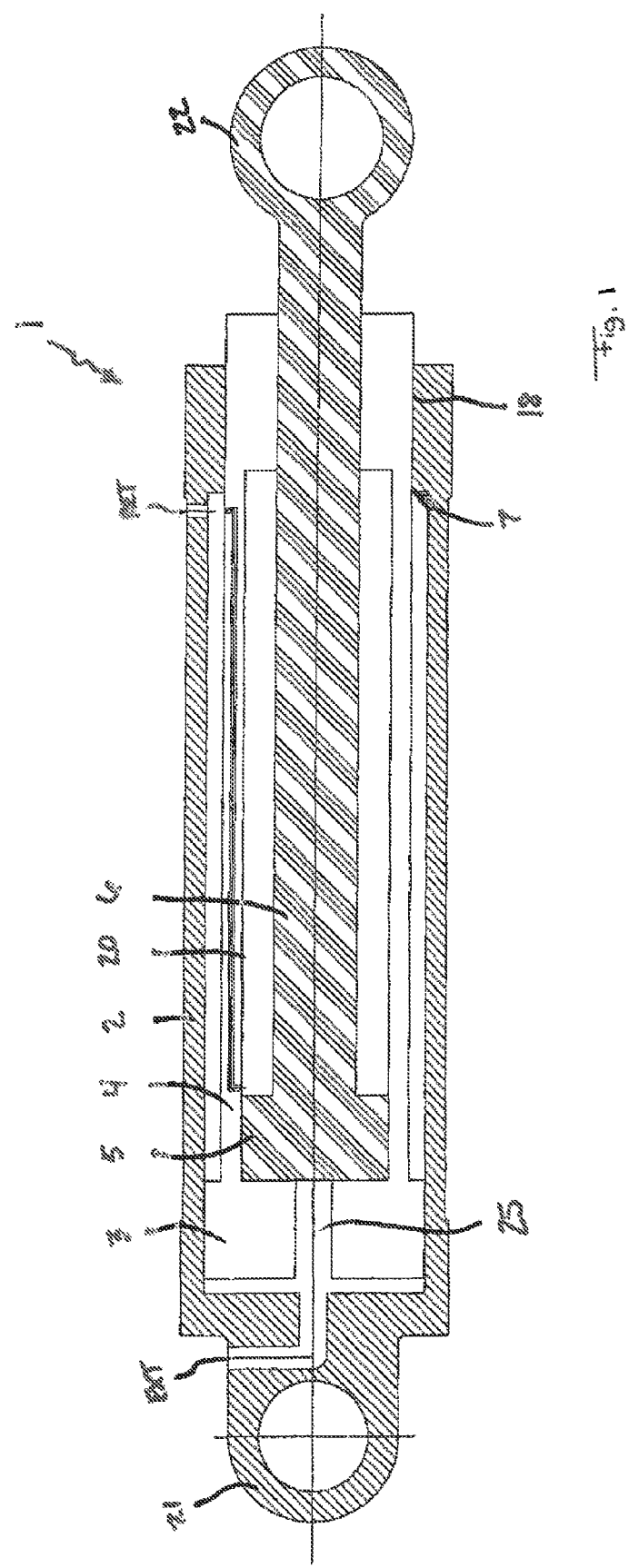
FIG. 1: a schematical, cross-sectional view of a multiple stage hydraulic cylinder with first stage and second stage pistons.

As shown by FIG. 1, the hydraulic cylinder 1 may comprise a stationary cylinder body including cylinder housing 2 which may form a cylindrical tube-like sleeve. At one end, the said cylinder housing 2 is closed and rigidly connected, e.g. by welding, to a connection or support element such as support boss 21. The cylinder housing's side opposite to its closed side, is provided with cylinder gland 18 to allow exit of the main cylinder piston rod 4.

At its inner end, the said main piston rod 4 is provided with a first stage piston 3 which is slidably received within the said cylinder housing 2 and separates the interior of said cylinder housing 2 into two pressure chambers for extending the cylinder and retracting the cylinder, respectively. The said piston 3 is in sealing engagement with the inner circumferential side of the cylinder housing 2, wherein sealing engagement is provided in a known manner to allow sliding of the piston.

As can be seen from FIG. 1, the said first piston rod 4 is formed as a hollow sleeve that is provided with a cylindrical bore forming a cylinder recess 20 in which a second stage piston 5 is slidably received. Again, the said second stage piston 5 is in sealing engagement with the inner circumferential surface of said sleeve-like first stage piston rod 4 so that the interior of said hollow first stage piston rod 4 is separated into two pressure chambers for extending and retracting, respectively.

The said second stage piston 5 is connected to a second stage piston rod 6 which extends beyond the open end of the first stage piston rod 4 and is rigidly connected to a connection or support member such as support boss 22, cf. FIG. 1.

Although not shown, it would be possible to provide the cylinder arrangement with further stages and further pistons. For example, a third stage piston might be slidably received within the second stage piston rod 6 and connected to a third stage piston rod which is then connected to the said support boss 22. Nevertheless, it is preferred to have a two-stage hydraulic cylinder for certain applications such as mining equipment or large construction equipment.

As can be seen from FIG. 1, the cylinder arrangement may have a central conduit connection EXT for applying hydraulic pressure to the extension pressure chambers and another central conduit connection RET for applying hydraulic pressure to the retraction pressure chambers. In the illustrated example, the extension conduit goes through the first stage piston 3 to be applied to both the first and second stages pistons. Hydraulic oil may flow from the central conduit connection EXT directly into the extension chamber facing the front side of the first stage piston 3. The extension pressure applied to first stage piston 3 may go through communication channels 25 through said first stage piston 3 to be applied to the second stage piston 5. Consequently, both pistons 3 and 5 are subject to substantially the same extension pressure.

On the other hand, retraction pressure may flow through the second stage piston rod 6 into the retraction chamber for retracting the second stage piston 5 into the first stage piston rod 4. Furthermore, the retraction pressure is also applied to retraction chamber for retracting the first stage piston 3.

Figure 2:
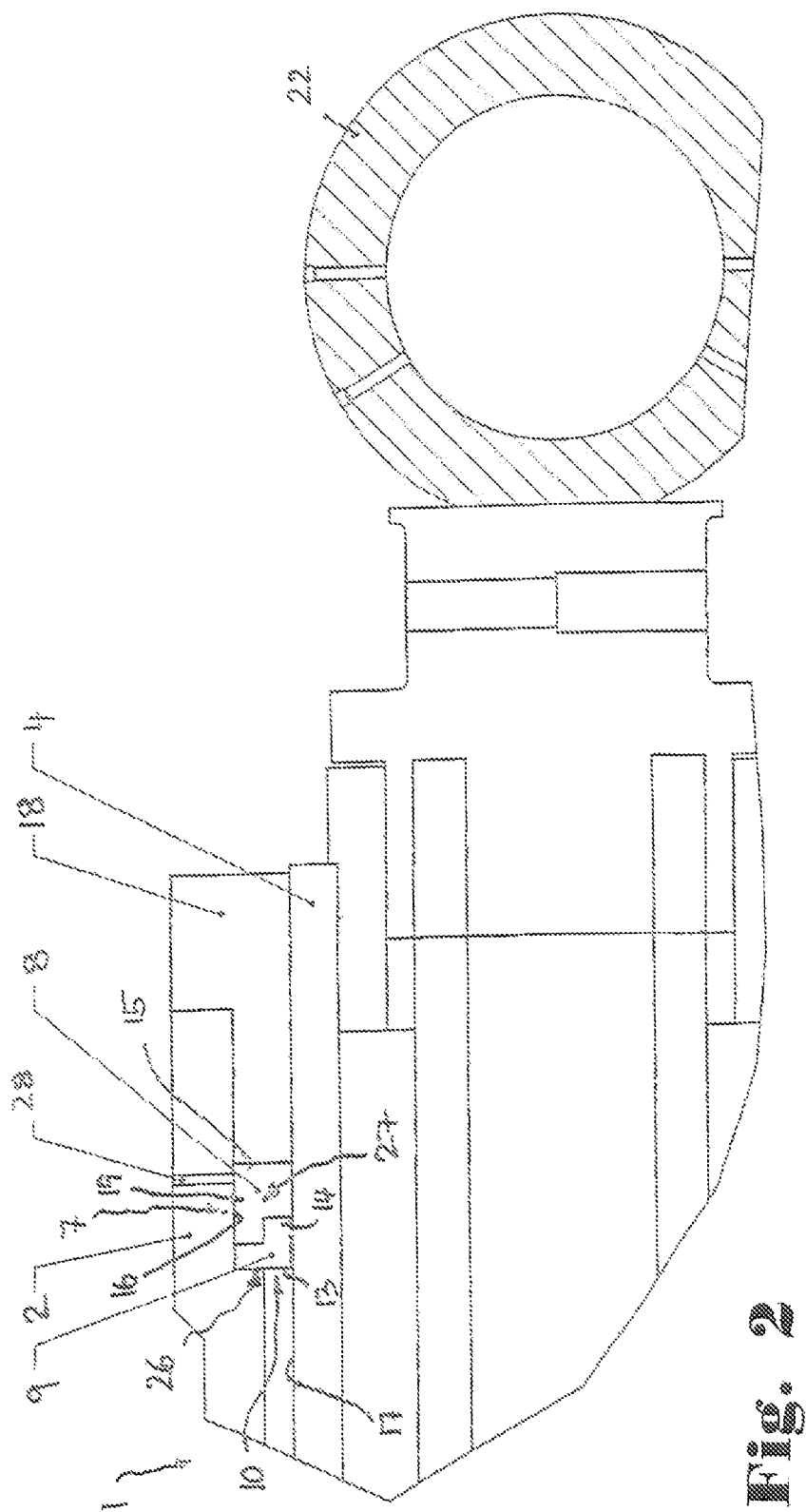
FIG. 2: a partial, enlarged cross-sectional view of the cushion device integrated into the cylinder housing of the hydraulic cylinder of FIG. 1, and FIG. 3: a partial, enlarged cross-sectional view of the cushion device according to another preferred embodiment having the gas cushion externally positioned.

As can be seen from FIG. 2, there is a cushioning device 7 incorporated into the stationary main body at the gland end. More particularly, the said cushion device or arrangement 7 includes a compression chamber 8 provided, at least in part, at the gland end of the interior of the cylinder housing 2. At the gland end, the cylinder housing 2 is provided with a stepped portion 26 where the inner circumferential surface of the cylinder housing 2 has an end portion with increased diameter. The cylinder gland 18 inserted into said increased diameter portion does not fully extend to the said stepped portion 26. Consequently, there is a recess or pocket defined between said stepped portion 26 of the cylinder housing 2 and the cylinder gland 18.

In the said pocket 27, a ring 10 is slidably received, said ring 10 forming a movable wall element defining a part of the said pocket. As shown by FIG. 2, the said ring-shaped wall element 9, the cylinder gland 18, the first stage piston rod 4 and the cylinder housing 2 together define compression chamber 8 of cushion arrangement 7. First stage piston rod 4 is in sealing engagement with both the cylinder gland 18 and ring 10 and may slide relative to said cylinder gland 18 and ring-shaped wall element 9 to effect the first stage displacement. On the other hand, the said ring-shaped wall element 9 may slide relative to cylinder housing 2 so that the volume of the compression chamber 8 varies with axial displacement of the said ring-shaped wall element 9.

The compression chamber 8 itself may be precharged with compressed gas so that the movable ring-shaped wall element 9 is urged into its expanded position shown in FIG. 2. Gas may be filled into said gas chamber 2 via gas conduit 28 opening to the exterior of cylinder housing 2.

Figure 3:
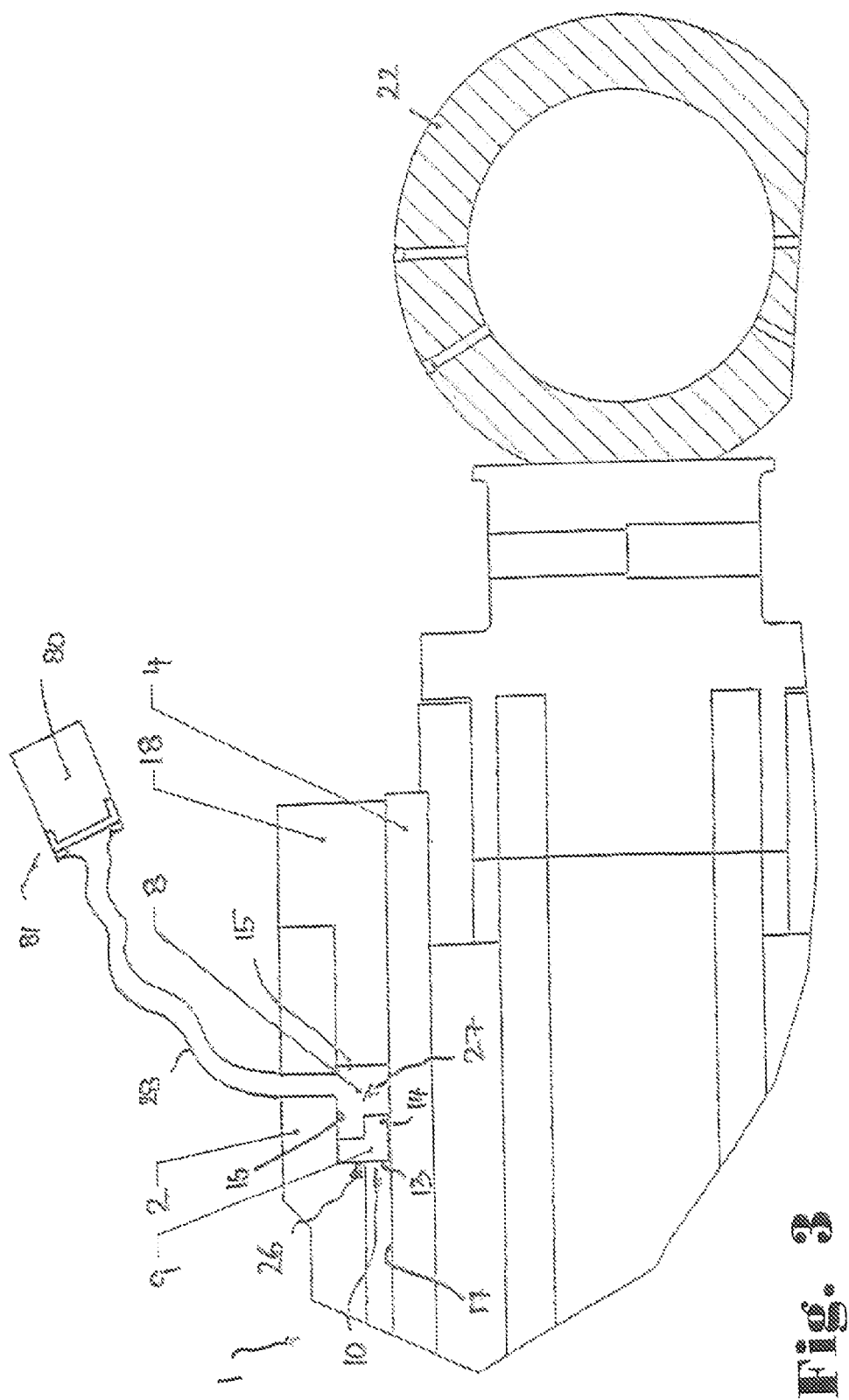

Alternatively, as shown in FIG. 3, the gas volume may be provided externally of the cylinder. More particularly, the aforementioned compression chamber 8 may be filled with a substantially incompressible fluid such as oil and may be connected to an external gas accumulator or gas spring 81 via conduit 28, thereby allowing incompressible fluid that is discharged from the compression chamber 8 upon compression thereof, to be applied to an external gas chamber 80 in which the compressible gas is received. The said external gas chamber is also provided with a movable and/or deformable wall element, e.g. a piston, which defines a part of the gas chamber 80. The incompressible fluid supplied via the aforementioned conduit 28 is applied to said movable and/or deformable wall element of the gas chamber 80, thereby transmitting the pressure of the incompressible fluid to the gas volume.

As apparent from FIGS. 1, 2 and 3, the first stage piston 3 approaches the ring-shaped wall element 9 when being extended and reaching the end portion of its displacement path. Upon contact of the first stage piston 3 with the ring-shaped wall element 9, the hydraulic fluid continues to cause the first stage of the cylinder to extend, thus causing the cushioning device to compress. As the cushioning device compresses, so does the gas which it is charged by. As the gas is compressed, the cushioning device reacts with the first stage piston by exerting force back against the first stage piston. This force occurs until the pressure against the first piston 3 becomes greater than the pressure required to move the second stage piston 5. At that time, the second stage piston 5 will begin to move. This happens before mechanical contact between the stationary body and the first stage piston 3 occurs, thus preventing mechanical shock.

The cushioning device 7 reduces the shock during stage change by adding time to the stage change what is quantified by a ramp in pressure as the gas is compressed instead of a near instantaneous stage change in absence of such device.

At full extension, the cushioning device 7 will be forced to full compression. At this position, the mechanical stopper section 14 of wall element 9 gets into engagement with cylinder gland 18. Thus, hard stop is designed into the movable ring-shaped wall element 9 preventing overpressure of the gas in the gas chamber and damage to the seals.

At the moment the cylinder is pressurized to retract from full extension, the cushioning device 7 will exert pressure against the back of the first stage piston 3 until the movable ring of the cushioning device 7 reaches its mechanical stop formed by the stepped portion 26.

The invention claimed is:

1. A multi-stage hydraulic cylinder for providing multiple stages of displacement with different cylinder forces, comprising
a cylinder housing (2), a first stage piston (3) slidably received in said cylinder housing (2) to be displaced over a first stage of displacement,
a second stage piston (5) coupled to said first stage piston (3) to be displaced together with said first stage piston (3) over said first stage of displacement and relative to said first stage piston (3) over a second stage of displacement,
said first and second stage pistons (3; 5) having effective pressure surface areas different from each other to provide for said different cylinder forces, and further comprising
a cushion arrangement (7) for smoothening stage changes, wherein
said cushion arrangement (7) includes at least one compression chamber (8) of variable volume with a movable and/or deformable chamber wall element (9) to be displaced by at least one of said pistons (3; 5) when approaching the transition zone between said first and second stages of displacement,
said compression chamber (8) being operatively connected to a gas volume to be compressed upon displacement of said chamber wall element (9) and compression of said compression chamber (8).

2. The multi-stage hydraulic cylinder of claim 1, wherein an expansion limiter (14) is provided for limiting displacement of said chamber wall element (9) in an expansion direction and a compression limiter (26) is provided for limiting displacement of said chamber wall element (9) in a compression direction, thereby allowing only limited displacement of the chamber wall element (9) between a more compressed position and a more expanded position.

3. The multi-stage hydraulic cylinder of claim 1, wherein at least a part of said compression chamber (8) is integrated into said cylinder housing (2) and said movable and/or deformable chamber wall element (9) is slidably received within said cylinder housing (2).

4. The multi-stage hydraulic cylinder of claim 1, wherein said gas volume is received within said compression chamber (8).

5. The multi-stage hydraulic cylinder of anyone of claim 1, wherein said compression chamber (8) is filled with a substantially incompressible fluid, and the said gas volume is received within a gas chamber (80) of variable volume of an external gas spring (81) which is connected to the said compression chamber (8) via a conduit (28) through which incompressible fluid discharged from the compression chamber (8) by compression thereof is applied to said gas spring (81) to effect compression of the gas volume thereof.

6. The multi-stage hydraulic cylinder of claim 1, wherein said chamber wall element (9) is positioned at the displacement path of the first stage piston and includes a contact portion (13) to be engaged and driven towards a more compressed position by a shoulder or face portion of said first stage piston (3).

7. The multi-stage hydraulic cylinder of claim 1, wherein said movable and/or deformable chamber wall element (9) forms a displaceable stopper for said first stage piston (3) at one of the end portions of the cylinder housing (2) and includes a mechanical stopper section (14) for stopping displacement of the chamber wall element (9) when said compression chamber (8) has reached a predetermined minimum volume larger than 0.

8. The multi-stage hydraulic cylinder of claim 1, wherein said movable and/or deformable chamber wall element (9) includes a displaceable ring (10) slidably received between an inner circumferential surface (16) of said cylinder housing (2) and an outer circumferential surface (17) of a piston rod/sleeve section (4) connected to said first stage piston (3).

9. The multi-stage hydraulic cylinder of claim 1, wherein the compression chamber (8) includes a ring-shaped compression section (15) between the cylinder gland (18) and said movable chamber wall element (9).

10. The multi-stage hydraulic cylinder of claim 1, wherein said movable and/or deformable chamber wall element (9) is displaceably received and trapped within a recess (19) and/or a stepped portion of the inner circumferential wall of the cylinder housing (2) and/or a cylinder gland (18) thereof.

11. The multi-stage hydraulic cylinder of claim 1, wherein a ratio of the effective pressure surface area of the first stage piston (3) to the effective pressure surface area of the second stage piston (5) is within a range from 120% to 300%.

12. The multi-stage hydraulic cylinder of claim 11, wherein the ratio of the effective pressure surface area of the first stage piston (3) to the effective pressure surface area of the second stage piston (5) is within a range from 120% to 200%.

13. The multi-stage hydraulic cylinder of claim 1, wherein the second stage piston (5) is slidably received within a cylinder recess (20) formed in said first stage piston (3) and/or in a hollow, sleeve-like piston rod (4) connected thereto.

14. The multi-stage hydraulic cylinder of claim 1, wherein a first stage pressure chamber for driving the first stage piston (3) and a second stage pressure chamber for driving the second stage piston (5) are connectable to each other via a common pressure supply conduit and/or are connectable to a common pressure connection to subject the first stage piston (3) as well as the second stage piston (5) to substantially the same pressure.

15. The multi-stage hydraulic cylinder of claim 2, wherein at least a part of said compression chamber (8) is integrated into said cylinder housing (2) and said movable and/or deformable chamber wall element (9) is slidably received within said cylinder housing (2).

16. The multi-stage hydraulic cylinder of claim 15, wherein said gas volume is received within said compression chamber (8).

17. The multi-stage hydraulic cylinder of claim 3, wherein said gas volume is received within said compression chamber (8).

18. The multi-stage hydraulic cylinder of claim 2, wherein said gas volume is received within said compression chamber (8).

19. The multi-stage hydraulic cylinder of anyone of claim 15, wherein said compression chamber (8) is filled with a substantially incompressible fluid, and the said gas volume is received within a gas chamber (80) of variable volume of an external gas spring (81) which is connected to the said compression chamber (8) via a conduit (28) through which incompressible fluid discharged from the compression chamber (8) by compression thereof is applied to said gas spring (81) to effect compression of the gas volume thereof.

\* \* \* \* \*